March 31, 1964  E. H. BLAKEMAN  3,126,740
METERING VALVE

Filed May 8, 1961  2 Sheets-Sheet 1

INVENTOR.
EDMUND H. BLAKEMAN

BY
WILSON, SETTLE & CRAIG

ATTORNEYS

March 31, 1964    E. H. BLAKEMAN    3,126,740
METERING VALVE
Filed May 8, 1961    2 Sheets-Sheet 2

INVENTOR.
EDMUND H. BLAKEMAN
BY
WILSON, SETTLE & CRAIG
Attorneys

United States Patent Office 3,126,740
Patented Mar. 31, 1964

3,126,740
METERING VALVE
Edmund H. Blakeman, 1185 Fairfax, Pontiac, Mich.
Filed May 8, 1961, Ser. No. 108,590
3 Claims. (Cl. 73—251)

This invention relates to a fluid feeding system, and more particularly to a fluid fuel feeding system and to a fluid fuel metering pump.

In the past it has been customary to heat dwellings such as trailer homes, apartments and the like utilizing a fuel reservoir for each unit. These fuel reservoirs, as in the case of oil storage tanks, consume valuable space. Particularly in the case of automobile trailer courts, where fifty-five gallon oil drums are often used, it will be readily appreciated that these are also unsightly and detract from the appearance of the court.

Accordingly a step forward in the art of trailer court operation would be provided by the utilization of a main oil storage tank located a discreet distance away from the trailer units and buried or suitably hidden from view by an ornamental fence or tree cover; with a small and inconspicuous oil metering unit adjacent each trailer, receiving oil from the main storage tank by a concealed supply line.

It is accordingly an important object of the present invention to provide a novel liquid fuel feeding system.

A further object is to provide a novel liquid fuel metering pump.

Another object is to provide a liquid fuel metering pump adapted to measure and supply liquid fuel under pressure and with extreme accuracy.

Other objects of this invention will appear in the following description and appended claims, reference being had to the accompanying drawings forming a part of this specification wherein like reference characters designate corresponding parts in the several views.

In a broad aspect the metering valve of the present invention is a highly accurate device for metering liquids such as liquid fuels supplied from a central supply source under pressure to individual points of consumption. The metering valve utilizes a reciprocable piston, oil fuel such as being fed alternately to one side and then the other of the same, and a reciprocable valve lying adjacent said piston and actuated by movement of the piston through a cam and stop arrangement.

Figure 1:
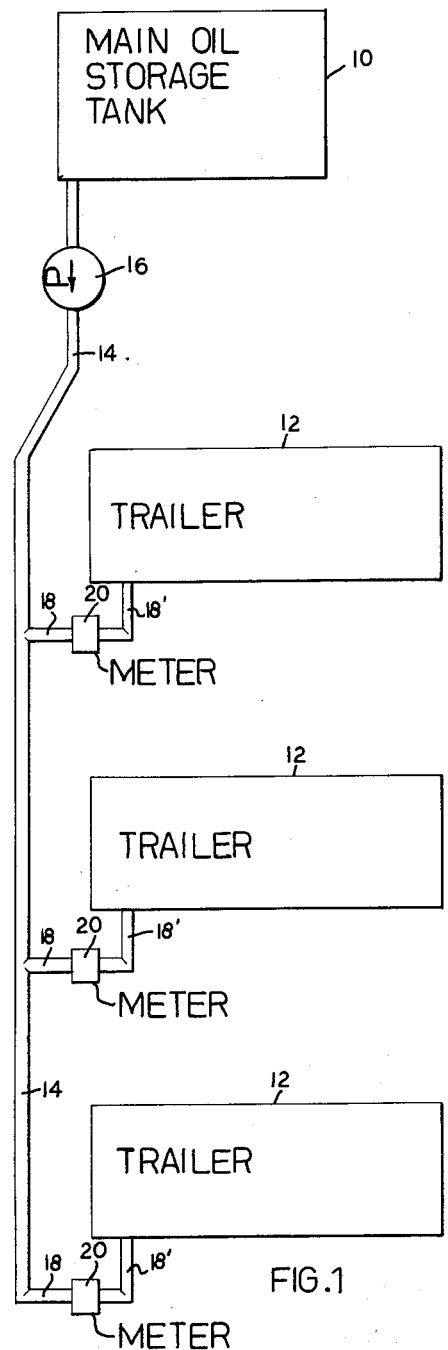
FIGURE 1 is a schematic view of a trailer court utilizing the fuel feeding system and metering valve of the present invention.

More particularly as shown in FIGURE 1 the fuel feeding system of the present invention is shown applied to an automotive trailer court. The system schematically includes a main oil storage tank 10 spaced at a discreet distance from the trailer units 12 and suitably hidden from view by an appropriate enclosure such as a shrub cover or an attractive fence (not shown). A main fuel supply line 14 leads from the main oil storage tank 10 along the rear of each of the spaced trailers 12 and includes a pump 16 for moving fuel from the main oil storage tank through the main supply line 14 at a desired pressure, say in the range of about 25 pounds per square inch. Leading from the main supply line 14, are branch feeder lines 18 for each of the trailers 12, and connected to an oil burning space heater contained therein.

In each of the branch feeder lines 18, there is placed a metering valve 20 of the present invention.

Since the main supply line 14 is concealed beneath the surface of the ground, as are the branch feeder lines 18, and since the meters 20 are very small, neat and inconspicuous, being placed adjacent a trailer 12, it will be seen that substantially the entire system is concealed from view to provide a highly attractive trailer court arrangement.

With this environmental background, the meter 20 will be described in detail along with its metering function to show how fluid fuels such as fuel oil can be pumped from a main oil storage tank for utilization by spaced trailer units.

Figure 2:
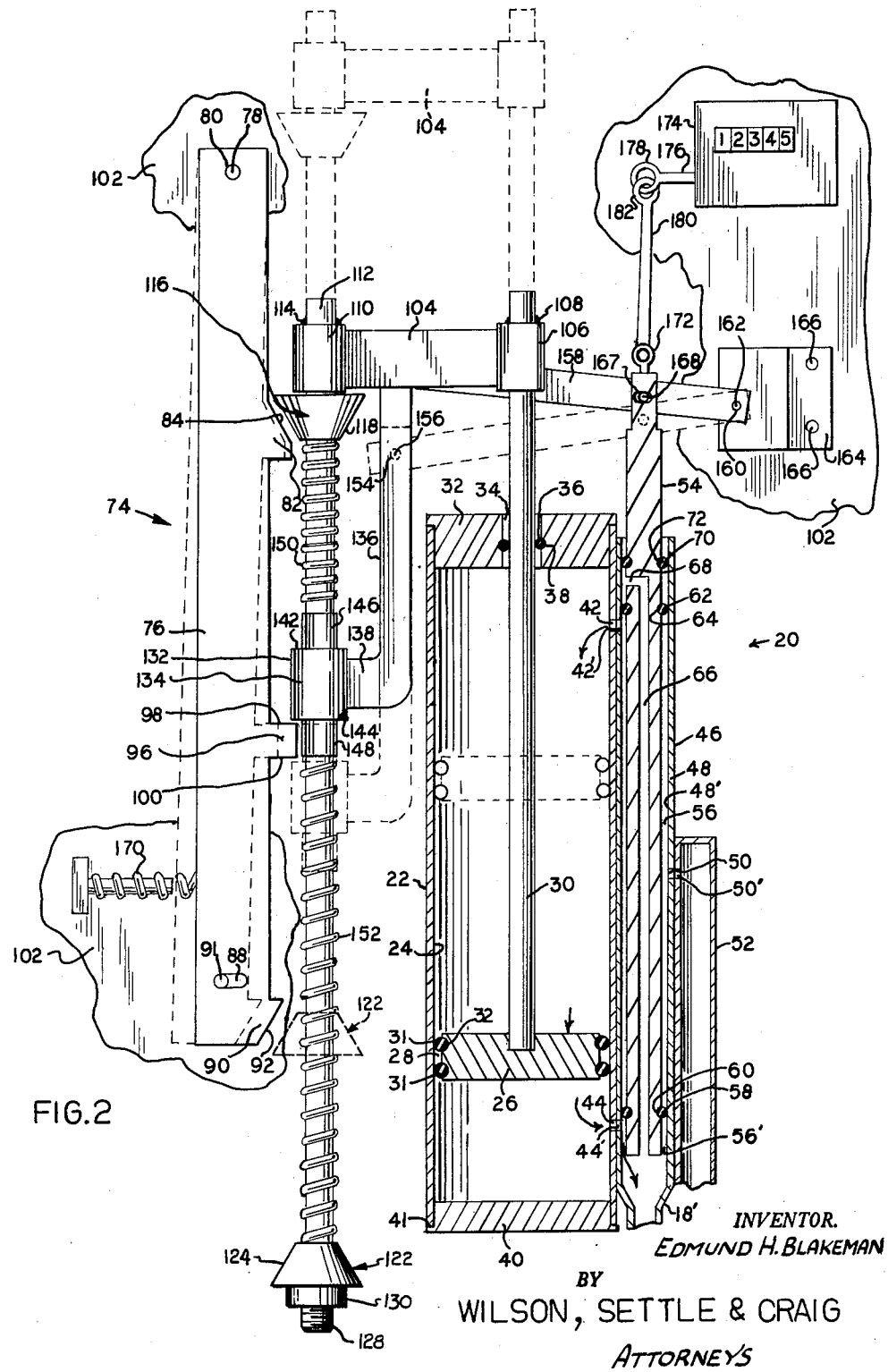
FIGURE 2 is a side elevational view, partly in section, of the liquid metering valve of the present invention, showing the piston adjacent the bottom end of its stroke.

As shown in FIGURE 2, the meter 20 includes a cylinder 22 having a smooth interior surface 24. A reciprocable piston 26 is movable in first one direction and then the other within the cylinder 22. The piston 26 has an outside diameter somewhat smaller than the inside diameter of the cylinder 22 and the space 28 therebetween is sealed by O-rings 31, retained in suitable circumferential grooves 32 formed on the perimeter of the piston 26, and compressed between the perimeter of the piston and the inner surface 24 of the cylinder 22. Thus one side of the piston is sealed in oil tight relationship from the other side of the piston.

The piston 26 includes an elongated piston rod 30, which passes through an annular cap 32 which closes the top of the cylinder 22. The annular cap 32 is provided with a cylindrical opening 34 provided with an O-ring 36 fitted within groove 38, formed in opening 34, in sealing engagement with the piston rod 30. The bottom end of the cylinder 22 is closed by a circular cap 40, provided with an annular shoulder 41 adapted to abut against the end of the cylinder 22 and when either press fitted or welded therein, provides an oil tight seal for the lower end of the cylinder.

At one side of the cylinder 22 there is provided an upper oil port 42 and a lower oil port 44. Lying alongside the cylinder 22 there is a valve assembly 46 adapted to admit a pressured fluid into first one of the valve ports 42 or 44 and simultaneously exhaust pressured fluid from the other port. The valve assembly 46 includes a tubular valve body 48 which is open at each end. The valve body 48 has openings 42' and 44' formed therein which mate with the openings 42 and 44 of the cylinder 22. The valve body 48 is suitably welded in axial alignment along the outside of the cylinder 22 and the ports 42' and 44' are placed in sealed communication with the ports 42 and 44.

Additionally the valve body 48 includes an inlet opening 50 located on the right side of the valve body 48 and intermediate said openings 42' and 44' and a supply tube 52 is fastened alongside the valve body 48 and having an opening 50' in fluid conducting relationship with the inlet opening 50 of valve body 48.

Positioned inside of the valve body 48 is a reciprocable valve stem 54. The valve stem 54 takes the form of an elongated tube of lesser diameter than the inside diameter of the valve body 48 and of a length somewhat greater than the length of the valve body 48 so that the top end extends out of the valve body for connection to an actuating mechanism. Inasmuch as the valve stem 54 is of lesser diameter than the valve body 48, a fluid passage 56 is provided between these two elements. An O-ring 58 is placed in a groove 60 formed near the lower end of the valve stem 54. The O-ring 58 is of sufficient size to bridge the fluid passage 56 and is compressed between the tubular valve stem 54 and the inside wall 48' of the valve body 48 to provide an oil seal. At a point near the top of the valve stem 54, a second O-ring 62 is fitted within a groove 64 formed on the valve stem 54, at a distance from the lower O-ring 58 substantially equal to the distance between the ports 42—42' and the ports 44—44'.

The valve stem 54 is provided with a bore 66 which extends from the bottom end thereof to a point slightly above the upper O-ring 62 terminating in a right angled bore 68 leading to the periphery of the valve stem. Spaced above the right angled bore 68, there is a third O-ring 70 positioned in an annular groove 72 formed in the valve stem 54 and adapted to bridge the space 56, in sealing relationship with the inside wall 48' of the valve body 48.

The valve stem 54 is adapted to be reciprocated in response to movement of the piston 26 to reverse oil flow in cylinder 22 as will be described later. For this purpose, both the piston rod 30 and the valve stem 54 are operably connected to a cam and stop arrangement 74, shown at the left in FIGURE 2. The cam and stop arrangement 74 is a lost motion device and includes an elongated cam and stop arm 76 pivoted at its upper end on a pin 78 passing through a hole 80 formed adjacent the top end of the cam and stop arm 76 and into a support plate 102. Positioned downwardly from the pin 78, there is formed a cam lobe 82 having a sloping cam surface 84 on the upper side thereof. Near the bottom of the cam and stop arm 76 there is provided a slot 88 and a limiting pin 91 therein. Limiting pin 91 is also fastened into the support plate 102. Thus the cam and stop arm 76 is adapted for movement between the solid and dotted outline views shown in FIGURE 2.

At the bottom end of the cam and stop arm 76 there is formed an upwardly sloping cam lobe 90 having an upwardly sloping surface 92. Medially of the upper and lower cam lobes 82 and 90 there is provided a stop element 96 with upper and lower flat stop surfaces 98 and 100.

The piston rod 30 at its upper end is provided with a horizontally disposed connecting arm 104 having a boss 106 formed on the right end thereof. The boss 106 is provided with a cylindrical aperture (not shown) adapted to fit over the piston rod 30 and is secured to the rod 30 as by weld 108. The other end of the connecting arm 104 is also provided with a boss 110, also provided with a cylindrical bore (not shown) into which the upper end of a cam and stop carrying rod 112 is inserted and fastened as by the weld 144.

Adjacent and beneath the boss 110 there is an annular cam 116 having a downwardly sloping cam surface 118 formed thereon. This annular cam is apertured to slidably fit upon the cam and stop carrying rod 112.

The bottom end of the cam and stop carrying rod 112 is also provided with a slidable annular cam 122 having an upwardly sloping cam surface 124. An internally threaded washer 130 is supplied to the rod 112 beneath the lower cam 122 by a locking thread 128. By this arrangement the lower cam 122 can be adjusted if desired, to regulate the stroke of the piston.

Intermediate the upper and lower ends of the cam and stop carrying rod 112 there is provided a slidable dual stop member 132, formed as a boss 134 on the end of a vertically disposed control arm 136. The control arm 136 has a horizontally disposed shoulder 138 on the end of which the boss 134 is formed.

The boss 134 is provided with upper and lower flat stop surfaces 142 and 144 adapted to engage the upper and lower flat stop surfaces 98 and 100 of the stop element 96. The boss 134 is also provided with upper and lower sleeves 146 and 148 and the boss and the upper and lower sleeves are provided with a cylindrical aperture (not shown) whereby the unit is adapted to slidably fit upon the cam and stop carrying rod 112. Interposed between the upper surface of the upper sleeve 146 and the lower end of the upper annular cam 116 there is a compression spring 150 of coiled configuration adapted to fit over the outside of the cam and stop carrying rod 112. This upper compression spring 150 is adapted to bias the boss 134 downwardly away from the upper annular cam 116. Similarly, between the upper surface of the bottom annular cam 122 and the bottom surface of the lower sleeve element 148, there is provided a lower compression spring 152 to bias the boss 134 upwardly and away from the bottom annular cam 122.

The upper end of the vertically disposed control arm 136 is provided with an aperture 154 and a pin 156 is inserted therein. A control arm 158 for the valve stem 54 is provided adjacent its left end with an aperture (hidden) alignable with the aperture 154 of the control arm 136 and the pin 156 is passed therethrough in pivotal relationship. Thus the left end of the control arm 158 and the upper end of the control arm 136 are pivotally connected. The right hand end of the control arm 158 is provided with an aperture 160 and a pivot pin 162 is passed therethrough. One end of the pivot pin 162 is secured in a bracket element 164 fastened as by rivets 166 to the frame plate 102. Thus the right end of the control arm 158 is provided with a fixed pivot, namely the pin 162.

The top end of the valve stem 54 is provided with a slot 167 and a pivot pin 168 is inserted therethrough. In alignment with the slot 167 in the top end of the valve stem 54, there is provided an aperture in the median portion of the control arm 158 through which the pivot pin 168 is passed. Thus it will be seen that the valve stem 54 is adapted to be moved in a reciprocable manner by vertical reciprocating movement of the control arm 136, moving lever 158 up and down.

OPERATION AND FUNCTION OF THE MECHANISM

As shown in FIGURE 2, oil under pressure passes through the supply tube 52, through the ports 50 and 50' and into the fluid passage 56 thence upwardly through the upper oil ports 42 and 42' and into the cylinder 22, forcing the piston 26 downwardly. This movement forces oil, previously admitted below the piston 26, to be exhausted through the apertures 44 and 44' and around the valve stem 54 into a short oil passage 56', beneath the bottom O-ring 58 and out through feeder line 18'. In the FIGURE 2 position of the valve stem 54, it will be noted that the bottom O-ring 58 is above the ports 44 and 44' thus sealing the fluid passage 56 therefrom and preventing incoming oil from leaving the bottom of the fluid passage 56 or from flowing into ports 44 and 44'. Also it will be noted that the upper O-ring 62 is above the upper passages 42 and 42' thus preventing oil from escaping from the top end of the valve body 48 and causing it to flow into the cylinder 22 through apertures 42 and 42'.

It will be noted further that the topmost O-ring 70 is positioned above the ports 42 and 42' adjacent the very top end of the valve body 48 and that the right angled bore 68 of the valve stem bore 66 is isolated between the top O-ring 70 and the next lower O-ring 62, thus preventing any fluid passage through the valve stem bore 66.

As the piston is moved downwardly from the dotted line position toward the solid line position, the connecting arm 104 carried on the top end of the piston rod 30 and supporting the cam and stop carrying rod 112 causes the upper annular cam 116 with its downwardly sloping cam surface 118 to move against the sloping cam surface 84 of the upper cam lobe 82 of the cam and stop arm 76 to move the came and stop arm to the left to the dotted line position, that is, away from the cam and stop carrying rod 112 and carry the stop element 96 on the cam and stop arm 76 out of engagement with the lower flat stop surface 144 of the movable boss 134 and thereby permitting the boss 134 and associated control arm 136 to be forced downwardly on cam and stop carrying rod 112 by the compression of spring 150 to the dotted outline position.

This movement causes the following action to take place. First, the boss 134 has the upper stop surface 142 thereof moved below the lower flat stop surface 100 of the stop element 96 of cam and stop arm 76 and when the cam surface 118 of the upper annular cam 116 reverses direction and passes upwardly a compression spring 170 forces the cam and stop arm 76 to the right to lock the upper flat stop surface 142 beneath the lower flat stop surface 100 of stop element 96 of cam and stop arm 76.

During this sequence of operations, still another action has taken place. The bottom annular cam 122 has been moved downwardly away from the cam surface 92 of the dotted outline position to the solid outline position. This released the compression on spring 152 and permitted the higher compression of the upper spring 150 to move the slidable dual stop member 132 downwardly to its dotted outline position beneath the stop 96.

Figure 3:
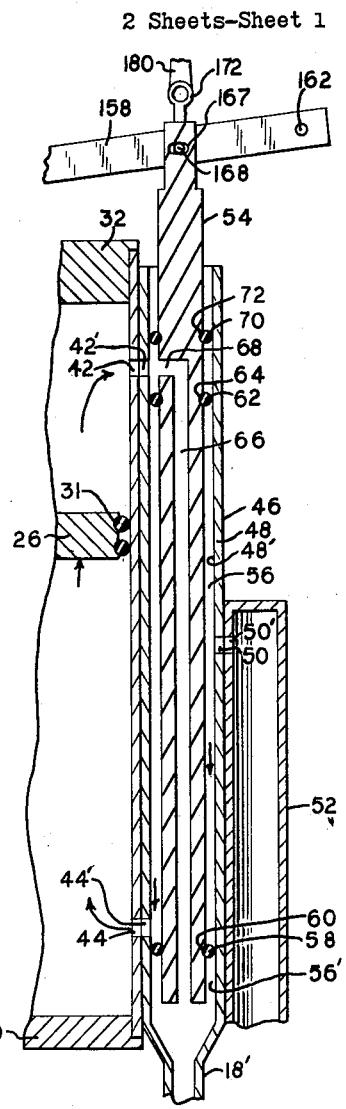
FIGURE 3 is a fragmentary section view showing the valve of FIGURE 2 in a reversed position with the piston moving toward the top of its stroke.

During this snap-like movement of the slidable dual stop member 134 from its solid outline position to its dotted outline position, it carried the control arm 136 and the control arm 158, pivoted to the upper end of the valve stem 54 in a downward manner to the dotted outline position of FIGURE 2 or the solid outline position of FIGURE 3. Thus the valve stem 54 is carried downwardly to a reversed position as shown in FIGURE 3, from the position shown in FIGURE 2.

Further description of the oil flow will now be provided with reference to FIGURE 3. When the valve stem 54 moves downwardly, the bottom O-ring 58 is moved below the apertures 44 and 44' and the upper O-ring 62 is moved below the apertures 42 and 42'; also, the right angled aperture 68 is brought into alignment with the upper apertures 42 and 42'. This action is effective to cause oil to flow from the supply tube 52 through the ports 50 and 50', into the fluid passage 56, and thence downwardly and through the ports 44 and 44' beneath the piston 26. Since the oil is under pressure it will reverse the direction of movement of the piston to an upward direction in the cylinder 22. The action of the valve is also effective when the right angled aperture 68 moves into alignment with the upper oil ports 42 and 42' to open the space above the piston to the interior of the valve stem bore 66. This permits oil above the piston to move through the ports 42 and 42', the right angled opening 68, the valve stem bore 66 and thence through the bottom end of the valve body 48.

Since the bottom O-ring 58 is now below the lower ports 44 and 44', the oil exhausting through passage 66 of valve stem 54 is prevented from reentering the system and is forced through the outlet conduit 18' to a point of consumption, such as an oil furnace, positioned within a trailer 12, FIGURE 1.

As shown in FIGURE 2, an eye 172 is attached to the upper end of the valve stem 54 and a counter 174 is fastened to the frame plate 102 by means (not shown). Counter 174 is provided with an actuating arm 176 having an eye 178 formed on the end thereof. Connected between the eye 172 on valve stem 54 and the eye 178 of the actuating arm 176, there is a rod 180 having an eye 182 formed on the top end and hooked into the eye 178 of the actuating arm 176. Thus when the valve stem 54 is snapped from its solid outline position to its dotted outline position as shown in FIGURE 2, the counter actuating arm 176 will be pulled downwardly to its dotted outline position to advance the counter one number.

The counter 174 is calibrated to the output of the piston for a downward and upward stroke of the piston. Thus the volumetric displacement of the meter 20 during such downward and upward movement of the piston 26 may be, for example, one-tenth of a gallon so that the rightmost number of the counter 174 would register in tenths of gallons and the remaining numbers would record full gallons. Thus it will be seen that as the piston moves through a complete stroke, that is from the top down and from the bottom back to the top, the metering pump 20 would be effective to deliver a calibrated amount of fuel, such as one-tenth of a gallon. This is converted into gallons delivered, by valve stem 54 moving the counter 174.

ADVANTAGES OF THE PRESENT INVENTION

Since the cylinder 22 of the metering pump 20 of the present invention can be made to close tolerances, it will be obvious that a highly accurate mechanism is provided. Further, the units are small and contain few working parts, all of which can be contained within a small and inconspicuous housing providing an apparatus of neat appearance. Further, in view of the few working parts, a trouble-free mechanism of long life is provided.

It is a unique aspect of the present invention that pressurized fluid or fuel is admitted to one side of a piston to drive the same and that the fuel previously admitted to the other side of the piston is similarly driven to a consumption point by the pressure applied to the opposite side of the piston and thus a very positive flow of fuel to the consumption point is assured.

Further, it will be obvious that the oil flow portion of the meter 20 of the present invention will be substantially free of stoppages as by sediment or similar foreign materials contained in the fuel being fed therethrough. Since the oil ports 42 and 42' and the lower oil ports 44 and 44' are of substantial dimension as are the ports 50 and 50' and since there are no valve elements fitting into these ports, it will be obvious that sediment and other foreign material can pass readily therethrough. Accordingly, an improved metering device of simplified construction and having a high degree of durability along with substantially maintenance free operation is provided in accordance with the present invention.

I claim:
1. In a fluid meter,
a cylinder,
first and second axially spaced ports in said cylinder,
a piston movable in said cylinder between said ports,
a piston rod connected to said piston and extending out of one end of said cylinder,
a valve having a body and an inlet port alternately connectable in fluid communication with said cylinder ports,
a source of pressurized fluid,
a fluid inlet conduit connecting said inlet port to said source of fluid,
a slidable valve stem in said valve body forming two exhaust ports each alternately alignable with only one of said cylinder ports,
a stop rod carried by said extending piston rod,
said rod having a movable stop thereon and means biasing said stop between first and second positions,
means connecting said stop to said slidable valve stem,
and a pivoted stop lever engageable by said slidable stop of said stop rod.

2. In a fluid meter,
a cylinder,
first and second axially spaced ports in said cylinder,
a piston in said cylinder and movable between said ports,
a piston rod connected to said piston,
a valve,
a slidable valve core in said valve defining a fluid inlet connectable with alternate ones of said cylinder ports,
a source of pressurized fluid,
conduit means connecting said source and said valve inlet,
said valve core also defining two exhaust ports, each alternately connectable with one of said cylinder ports,
means connecting said exhaust ports to a point of use,
a valve lever connected to said valve core for moving said core, a stop rod carried by said piston rod and having a movable stop thereon,
means biasing said movable stop between first and second positions,
a stop lever having a fixed stop engageable with said movable stop to retain said movable stop in one or the other of its two positions,
means connecting said movable stop to said valve lever,
and means for moving said stop lever to carry said fixed stop out of engagement with said movable stop.

3. In a fluid meter,
a cylinder,
first and second axially spaced ports in said cylinder,
a piston in said cylinder movable between said ports,
a piston rod connected to said piston,
a two-position reciprocating valve defining a fluid inlet connectable with alternate ones of said ports and a fluid outlet alternately connectable with the other of said ports,
a source of pressurized fluid,
conduit means connecting said source and said valve inlet,
means connecting said fluid outlet to a point of use,
an elongated cam and stop rod carried by said piston rod,
first and second cams slidable on said rod,
a slidable stop on said rod between said cams,
means on said rod biasing said cams and stop away from one another,
means connecting said slidable stop and said valve,
and a lever including spaced cam lobes and an intermediate stop, said lever being movable into and out of engagement with said cams and stop of said stop lever.

References Cited in the file of this patent
UNITED STATES PATENTS

| | | |
|---|---|---|
| 204,357 | Melling | May 28, 1878 |
| 1,534,238 | Mercer | Apr. 21, 1925 |
| 1,870,897 | Davis | Aug. 9, 1932 |
| 1,901,178 | Malm | Mar. 14, 1933 |
| 1,939,899 | Hurlbrink | Dec. 19, 1933 |